(12) United States Patent
Shachal

(10) Patent No.: US 7,797,592 B1
(45) Date of Patent: Sep. 14, 2010

(54) AUTOMATIC COMMUNICATION CHANNEL FAULT MITIGATION

(75) Inventor: Yaron Shachal, Ramat Hasharon (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/394,417

(22) Filed: Feb. 27, 2009

Related U.S. Application Data

(62) Division of application No. 11/286,824, filed on Nov. 23, 2005, now Pat. No. 7,525,992.

(51) Int. Cl.
  *G01R 31/28* (2006.01)
  *H24L 12/28* (2006.01)
  *H24J 3/24* (2006.01)

(52) U.S. Cl. .................. 714/712; 370/389; 370/473

(58) Field of Classification Search .............. 714/712, 714/820, 821, 799; 370/242, 248, 395.21, 370/464, 468, 469, 473, 389, 474, 532, 533
See application file for complete search history.

(56) References Cited

U.S. PATENT DOCUMENTS

| | | | |
|---|---|---|---|
| 4,756,007 A | 7/1988 | Qureshi et al. | |
| 4,964,120 A | 10/1990 | Mostashari | |
| 5,608,755 A * | 3/1997 | Rakib | 375/219 |
| 5,701,427 A * | 12/1997 | Lathrop | 709/237 |
| 5,862,145 A | 1/1999 | Grossman et al. | |
| 6,154,464 A * | 11/2000 | Feuerstraeter et al. | 370/463 |
| 6,366,557 B1 | 4/2002 | Hunter | |
| 6,373,903 B1 * | 4/2002 | Wynn | 375/308 |
| 6,418,160 B1 | 7/2002 | Miller | |
| 6,510,171 B1 | 1/2003 | Valentine | |
| 6,516,352 B1 * | 2/2003 | Booth et al. | 709/250 |
| 7,203,851 B1 * | 4/2007 | Lo et al. | 713/310 |
| 7,477,172 B1 * | 1/2009 | Lo et al. | 341/101 |
| 2001/0024457 A1 | 9/2001 | Barry et al. | |
| 2005/0259685 A1 * | 11/2005 | Chang et al. | 370/469 |
| 2005/0271064 A1 * | 12/2005 | Chang et al. | 370/397 |
| 2006/0013341 A1 | 1/2006 | Suzuki | |
| 2007/0047485 A1 * | 3/2007 | Gorokhov et al. | 370/329 |

* cited by examiner

*Primary Examiner*—Phung M Chung

(57) ABSTRACT

A physical layer device includes a coding circuit to transmit first data, and to receive second data, at one of a plurality of data rates. A communication circuit transmits first signals representing the first data, and receives second signals representing the second data, over one or more of a plurality of channels. A test circuit determines a condition of the channels. A control circuit selects the one of the plurality of the data rates, and selects the one or more of the plurality of the channels, based on the condition of the channels determined by the test circuit.

24 Claims, 2 Drawing Sheets

AUTOMATIC COMMUNICATION CHANNEL FAULT MITIGATION

CROSS-REFERENCE TO RELATED APPLICATIONS

This application is a divisional of U.S. patent application Ser. No. 11/286,824 filed Nov. 23, 2005, now U.S. Pat. No. 7,525,992, issued Apr. 28, 2009. The disclosure of the above application is incorporated herein by reference in its entirety.

BACKGROUND

The present invention relates generally to data communication. More particularly, the present invention relates to automatic communication channel fault mitigation.

SUMMARY

In general, in one aspect, the invention features physical layer device comprising: a coding circuit comprising a first communication circuit to receive a plurality of data sets, each of the data sets comprising a plurality of bits of data, and a second communication circuit to transmit a plurality of symbol sets each comprising a plurality of symbols, wherein each of the symbol sets represents one of the data sets; a multiplexer comprising a plurality of third communication circuits each to receive a respective one of the symbols in each of the symbol sets, and a plurality of fourth communication circuits, wherein the multiplexer selects one or more of the fourth communication circuits, and transmits the symbol sets only from the selected fourth communication circuits; and a media circuit comprising a plurality of fifth communication circuits each in communication with one of the fourth communication circuits, and a plurality of sixth communication circuits to transmit signals over a plurality of respective channels, wherein the signals transmitted by each of the sixth communication circuits represent the symbols received by a corresponding one of the fifth communication circuits.

Some embodiments comprise an integrated circuit comprising the physical layer device. Some embodiments comprise an Ethernet communication device comprising the integrated circuit. In some embodiments, each of the channels comprises a twisted pair conductor. In some embodiments, the multiplexer selects the one or more of the fourth communication circuits according to a control signal, further comprising: a control circuit to generate the control signal according to a condition of the channels. In some embodiments, the control circuit generates a second control signal to control a rate at which the data sets are received by the physical layer device. In some embodiments, the control circuit generates a message identifying the channels corresponding to the selected fourth communication circuits; and the media circuit transmits a second signal representing the message. Some embodiments comprise a media access controller to transmit the data sets to the physical layer device according to the second control signal. Some embodiments comprise a test circuit to determine the condition of the channels. In some embodiments, the coding circuit encodes the symbols according to Pulse Amplitude Modulation 5 (PAM-5). In some embodiments, the sixth communication circuits receive further signals over the plurality of respective channels; the fifth communication circuits generate further symbol sets each comprising a plurality of further symbols, wherein the further symbols generated by each of the fifth communication circuits represent the further signals received by a corresponding one of the sixth communication circuits; the multiplexer transmits, from the third communication circuits, only the further symbols received by the selected fourth communication circuits; and the second communication circuit receives the further symbol sets; and the first communication circuit generates a plurality of further data sets, each of the further data sets comprising a plurality of bits of data and representing one of the further symbol sets.

In general, in one aspect, the invention features a physical layer device comprising: means for coding comprising first communication means for receiving a plurality of data sets, each of the data sets comprising a plurality of bits of data, and second communication means for transmitting a plurality of symbol sets each comprising a plurality of symbols, wherein each of the symbol sets represents one of the data sets; means for multiplexing comprising a plurality of third communication means each for receiving a respective one of the symbols in each of the symbol sets, and a plurality of fourth communication means, wherein the means for multiplexing selects one or more of the fourth communication means, and transmits the symbol sets only from the selected fourth communication means; and media means comprising a plurality of fifth communication means each in communication with one of the fourth communication means, and a plurality of sixth communication means for transmitting signals over a plurality of respective channels, wherein the signals transmitted by each of the sixth communication means represent the symbols received by a corresponding one of the fifth communication means.

Some embodiments comprise an integrated circuit comprising the physical layer device. Some embodiments comprise an Ethernet communication device comprising the integrated circuit. In some embodiments, each of the channels comprises a twisted pair conductor. In some embodiments, the means for multiplexing selects the one or more of the fourth communication means according to a control signal, further comprising: control means for generating the control signal according to a condition of the channels. In some embodiments, the control means generates a second control signal to control a rate at which the data sets are received by the physical layer device. In some embodiments, the control means generates a message identifying the channels corresponding to the selected fourth communication means; and the media means transmits a second signal representing the message. Some embodiments comprise media access control means for transmitting the data sets to the physical layer device according to the second control signal. Some embodiments comprise test means for determining the condition of the channels. In some embodiments, the means for coding encodes the symbols according to Pulse Amplitude Modulation 5 (PAM-5).

Some embodiments comprise a physical layer device comprising: a coding circuit to transmit first data, and to receive second data, at one of a plurality of data rates; and a communication circuit to transmit first signals representing the first data, and to receive second signals representing the second data, over one or more of a plurality of channels; a test circuit to determine a condition of the channels; and a control circuit to select the one of the plurality of the data rates, and to select the one or more of the plurality of the channels, based on the condition of the channels determined by the test circuit.

In some embodiments, the plurality of data rates comprises a first data rate and a second data rate, wherein the first data rate is greater than the second data rate; and the control circuit selects N of the channels when selecting the first data rate and selects M of the channels when selecting the second data rate, wherein N>M. Some embodiments comprise an Ethernet communication device comprising the physical layer device. In some embodiments, each of the channels comprises a twisted pair conductor.

In general, in one aspect, the invention features a physical layer device comprising: coding means for transmitting first data, and for receiving second data, at one of a plurality of data rates; and communication means for transmitting first signals representing the first data, and for receiving second signals representing the second data, over one or more of a plurality of channels; test means for determining a condition of the channels; and control means for selecting the one of the plurality of the data rates, and for selecting the one or more of the plurality of the channels, based on the condition of the channels determined by the test means.

In some embodiments, the plurality of data rates comprises a first data rate and a second data rate, wherein the first data rate is greater than the second data rate; and wherein the control means selects N of the channels when selecting the first data rate and selects M of the channels when selecting the second data rate, wherein N>M. Some embodiments comprise an Ethernet communication device comprising the physical layer device. In some embodiments, each of the channels comprises a twisted pair conductor.

In general, in one aspect, the invention features a method for a physical layer device comprising a plurality of output circuits, the method comprising: receiving a plurality of data sets each comprising a plurality of bits of data; generating a plurality of symbol sets each comprising a plurality of symbols, wherein each of the symbol sets represents one of the data sets; selecting one or more of the output circuits; and transmitting signals representing the symbol sets only from the selected output circuits. In some embodiments, the physical layer device is Ethernet compliant. In some embodiments, the one or more output circuits are selected according to a condition of one or more channels over which the symbol sets are transmitted by the output circuits. Some embodiments comprise controlling a rate at which the data sets are received by the physical layer device. Some embodiments comprise transmitting a message over the channels identifying the channels corresponding to the selected output circuits. Some embodiments comprise determining the condition of the channels. Some embodiments comprise encoding the symbols according to Pulse Amplitude Modulation 5 (PAM-5).

The details of one or more implementations are set forth in the accompanying drawings and the description below. Other features will be apparent from the description and drawings, and from the claims.

Figure 1:
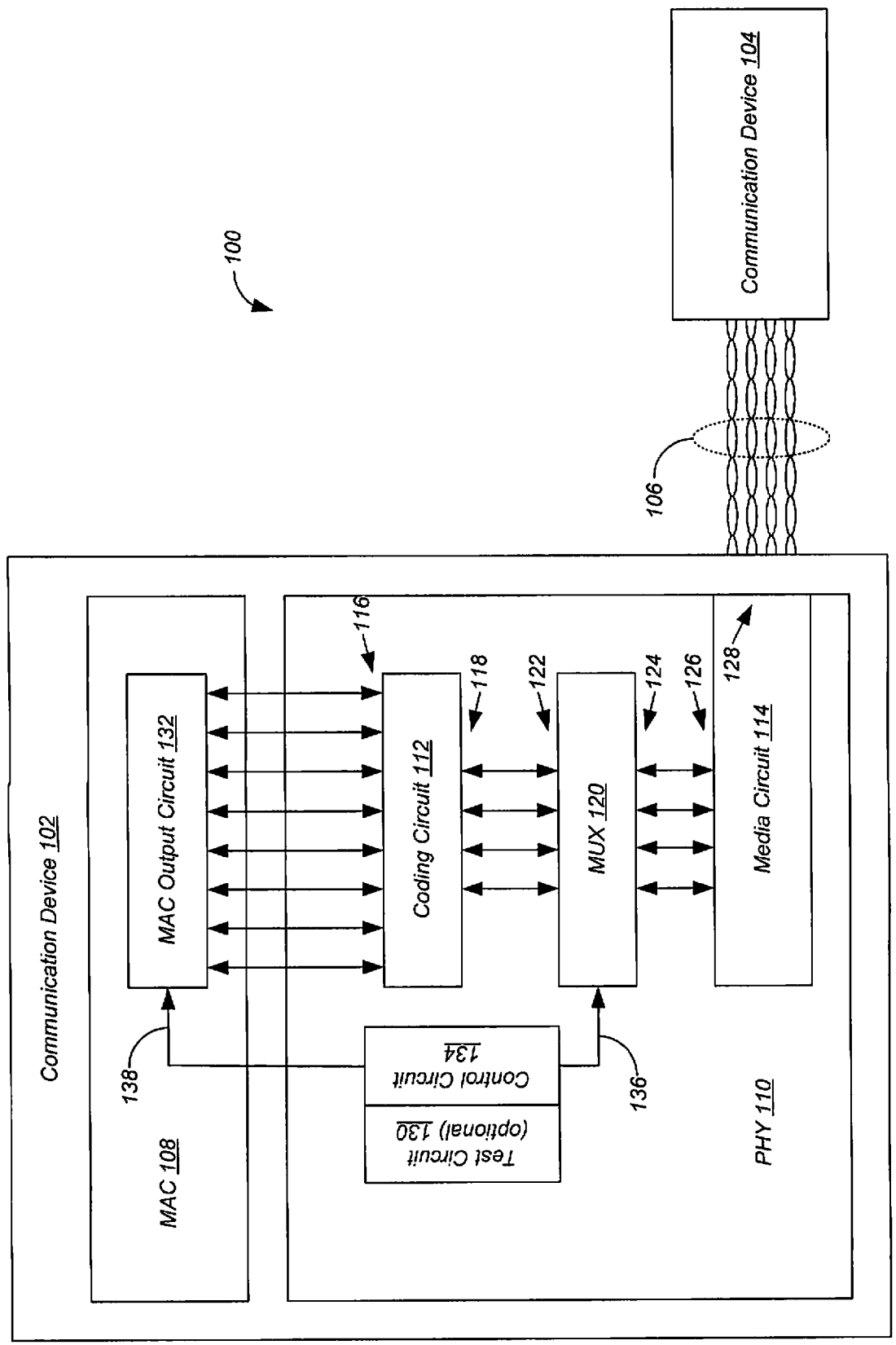
FIG. 1 shows a data communications system comprising two communication devices in communication over a plurality of channels according to a preferred embodiment of the present invention.

The leading digit(s) of each reference numeral used in this specification indicates the number of the drawing in which the reference numeral first appears.

DETAILED DESCRIPTION

Embodiments of the present invention provide communication devices for data communications that automatically mitigate faults in communication channels, in particular by automatically reconfiguring the physical layer devices to move data communications traffic from failed channels to working channels. While embodiments of the present invention are described in terms of gigabit Ethernet communications, other embodiments are contemplated. For example, other communication channels can be used, such as optical, wireless, and the like.

FIG. 1 shows a data communications system 100 comprising two communication devices 102, 104 in communication over a plurality of channels 106 according to a preferred embodiment of the present invention. Communication devices 102, 104 are preferably Ethernet devices, and can be implemented as switches, network adapters, and the like. Channels 106 are preferably implemented as four duplex channels 106 each comprising a twisted pair of conductors. For example, channels 106 can be implemented collectively as a standard, Cat-5 Ethernet cable.

Communication device 102 comprises a media access controller (MAC) 108 comprising a MAC output circuit 132 and a physical layer device (PHY) 110 comprising a coding circuit 112, a control circuit 134, an optional test circuit 130, a multiplexer (MUX) 120, and a media circuit 114. Coding circuit 112 comprises a communication circuits 116 in communication with MAC 108 and communication circuits 118 in communication with MUX 120, and is preferably implemented as a modified Physical Coding Sublayer (PCS) circuit. MUX 120 comprises four communication circuits 122 in communication with coding circuit 112 and four communication circuits 124 in communication with media circuit 114. Media circuit 114 comprises communication circuits 126 in communication with MUX 120 and communication circuits 128 in communication with channels 106, and is preferably implemented as a conventional Physical Medium Attachment (PAM) circuit and a Physical Media Dependent (PMD) circuit. Communication device 104 preferably comprises similar elements. MAC 108 and PHY 110 are preferably implemented as one or more integrated circuits.

PHY 110 receives data from MAC 108 for transmission over channels 106, and transmits data received over channels 106 to MAC 108. Preferably the data sets each comprise eight bits of data according to the gigabit medium independent interface (GMII).

Coding circuit 112 generates symbol sets each comprising four symbols and representing one of the data sets received from MAC 108, and transmits the data sets from communication circuits 118 to MUX 120. Coding circuit 112 also generates data sets based on symbol sets received from MUX 120 and transmits the data sets from communications circuits 116 to MAC 108. Preferably the symbols are encoded according to Pulse Amplitude Modulation 5 (PAM-5).

Each communication circuit 122 in MUX 120 receives a respective one of the four symbols in each of the symbol sets transmitted by coding circuit 112. MUX 120 selects one or more of communication circuits 124, and transmits the symbol sets only from the selected communication circuits 124. Communication circuits 124 of MUX 120 also receive symbol sets from media circuit 114. Communication circuits 122 transmit, to coding circuit 112, only the symbol sets received on the selected communication circuits 124, preferably using all four communication circuits 122. MUX 120 selects communication circuits 124 according to a control signal 136 generated by control circuit 134 according to the condition of channels 106. The condition of each of channels 106 can include, for example, working, failed, and the like.

If necessary, for example due to a reduced number of working channels 106, control circuit 134 optionally generates a further control signal 138 to control a rate at which the data sets are transmitted by MAC 108 and received by PHY 110. In response, MAC output circuit 132 reduces the rate at which MAC 108 transmits the data sets to PHY 110 by an amount according to control signal 138.

Each communication circuit 126 of media circuit 114 is in communication with a corresponding one of communication circuits 124 of MUX 120, and so receives the symbols transmitted by that communication circuit 124. Each communication circuit 128 transmits signals, over a respective one of channels 106, representing the symbols received by the corresponding communication circuit 126 according to techniques well-known in the relevant arts. Similarly, communication circuits 128 receive signals representing symbols, and transmit the symbols from the respective communication circuits 126 to MUX 120. In some embodiments, the portions of media circuit 114 that correspond to the channels 106 that are not to be used for communication are shut down, disabled, or the like, for example in order to conserve power.

The condition of each of channels 106 is preferably determined by optional test circuit 130. Test circuit 130 is preferably implemented as disclosed in U.S. patent application Ser. No. 11/129,203 filed May 13, 2005, the disclosure thereof incorporated by reference herein in its entirety. Test circuit 130 can determine whether a channel 106 is working or failed, for example due to an open circuit or short circuit between the twisted-pair conductors in the channel 106.

When one or more channels 106 have a failed condition, control circuit 134 causes MUX 120 to select communication circuits 124 corresponding to the channels 106 that remain in a working condition so that the symbol sets generated by coding circuit 112 are transmitted only over the working channels 106, and only the signals received over the working channels 106 are passed to coding circuit 112.

Figure 2:
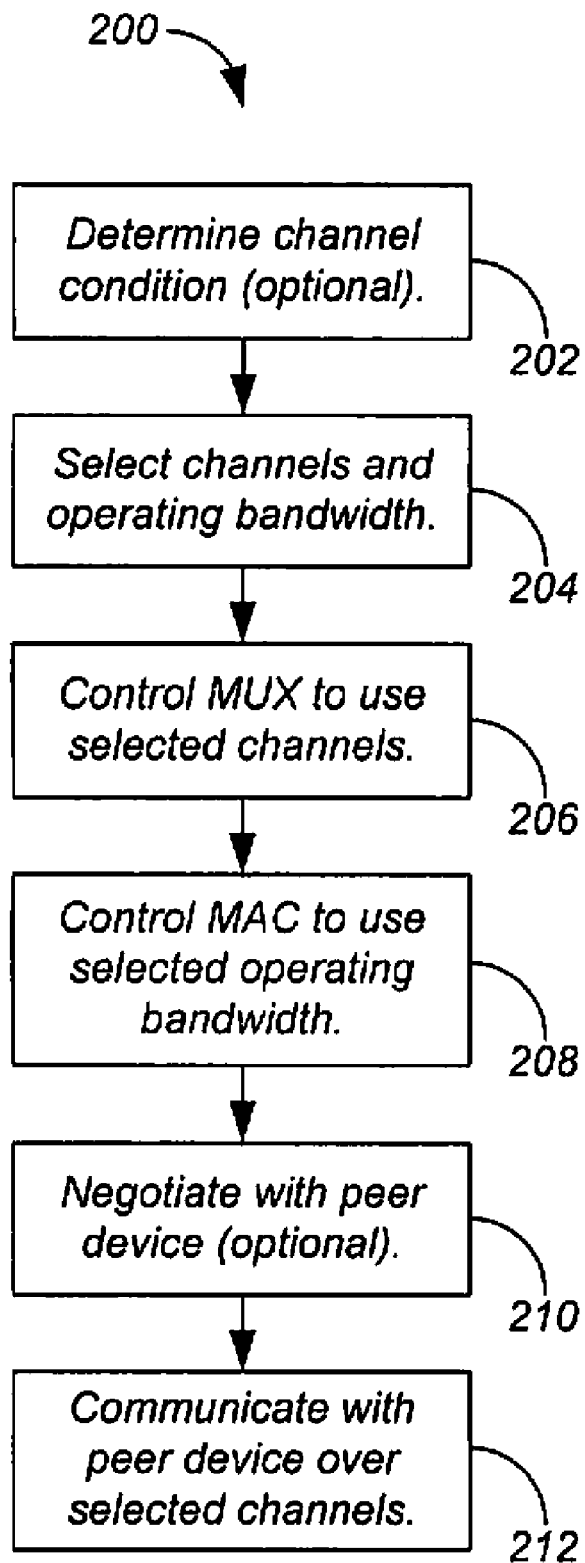
FIG. 2 shows a process for a communication device of FIG. 1 according to a preferred embodiment of the present invention.

FIG. 2 shows a process for communication device 102 of FIG. 1 according to a preferred embodiment of the present invention. Test circuit 130 optionally determines a condition of channels 106, for example as described above (step 202). Based on the channel condition, control circuit 134 selects an operating bandwidth, and which channels 106 to use for communication (step 204).

For example, when one or two channels 106 are in a failed condition, control circuit 134 causes MUX 120 to select two of the MUX output circuits 124 corresponding to working channels 106. For gigabit Ethernet, the lowest consecutive available twisted pairs are preferably selected. That is, pairs 1 and 2 are selected, but if unavailable, then pairs 2 and 3 are selected, but if unavailable, then pairs 3 and 4 are selected, but if unavailable, then pairs 4 and 1 are selected. MUX 120 then transmits each set of four symbols from the selected MUX output circuits 124 as two consecutive sets of two symbols. Because in this configuration PHY 110 passes data at only half the nominal rate (that is, the rate at which PHY 110 passes data when all four channels 106 are working), control circuit 134 asserts control signal 138 so that MAC output circuit 132 of MAC 108 transmits the data sets to PHY 110 at only half the nominal rate. For example, for gigabit Ethernet, the nominal rate for transmission of data sets from MAC 108 to PHY 110 is 125 Mbps, and the nominal rate of transmission of symbol sets from coding circuit 112 to media circuit 114 is 125 Msps. Therefore, in this example, the rate of transmission of data sets from MAC 108 to PHY 110 is reduced to 62.5 Mbps. Of course, the nominal rate of transmission of symbol sets from coding circuit 112 to media circuit 114 remains 125 Msps. Signals received over channels 106 are processed in a similar manner. In some embodiments, the coding performed by coding circuit 112 is modified so as not to produce symbol combinations that will produce excessive noise on channels 106.

As another example, when three channels 106 are in a failed condition, control circuit 134 causes MUX 120 to select one of the MUX output circuits 124 corresponding to a working channel 106. MUX 120 then transmits each set of four symbols from the selected MUX output circuit 124 as four consecutive symbols. Because in this configuration PHY 110 passes data at only one quarter of the nominal rate, control circuit 134 asserts control signal 138 so that MAC output circuit 132 of MAC 108 transmits the data sets to PHY 110 at only one quarter of the nominal rate. Therefore, for gigabit Ethernet, in this example, the rate of transmission of data sets from MAC 108 to PHY 110 is reduced to 31.25 Mbps. Of course, the nominal rate of transmission of symbol sets from coding circuit 112 to media circuit 114 remains 125 Msps. Signals received over channels 106 are processed in a similar manner. In some embodiments, the coding performed by coding circuit 112 is modified so as not to produce symbol combinations that will produce excessive noise on channels 106.

As another example, when all four channels 106 are in a working condition, control circuit 134 causes MUX 120 to select all four of the MUX output circuits 124. MUX 120 then transmits each set of four symbols from the selected MUX output circuit 124 as a set of four symbols. Because in this configuration PHY 110 passes data at the nominal rate, control circuit 134 asserts control signal 138 so that MAC output circuit 132 of MAC 108 transmits the data sets to PHY 110 at the nominal rate. Therefore, for gigabit Ethernet, in this example, the rate of transmission of data sets from MAC 108 to PHY 110 is 125 Mbps. Of course, the nominal rate of transmission of symbol sets from coding circuit 112 to media circuit 114 remains 125 Msps. Signals received over channels 106 are processed in a similar manner.

In some embodiments, communication device 102 optionally informs communication device 104 of the channel fault and/or new configuration (step 218). For example, control circuit 134 generates a message identifying the channels 106 corresponding to the selected MUX output circuits 124, and media circuit 114 transmits a signal representing the message over the identified channels. In other embodiments, communication devices 102 and 104 negotiate to select the channels 106 to be used for communication.

Control circuit 134 asserts control signal 136 to cause MUX 120 to select the correct channels 106 (step 206), and asserts control signal 136 to cause MAC 108 to operate at the selected bandwidth (step 208). Communication device 102 then optionally negotiates on the selected channels 106 to verify that communication device 104 has selected the same operating bandwidth and channels 106 as communication device 102 (step 210). Communication devices 102 and 104 then communicate over the selected channels 106 (step 212).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A physical layer device comprising:
a coding circuit to transmit first data, and to receive second data, at one of a plurality of data rates;
a communication circuit to transmit first signals representing the first data, and to receive second signals representing the second data, over one or more of a plurality of channels;
a test circuit to determine a condition of the channels; and
a control circuit to select the one of the plurality of the data rates, and to select the one or more of the plurality of the channels, based on the condition of the channels determined by the test circuit,
wherein the control circuit transmits a control signal to a media access controller based on the condition to adjust a rate at which data sets are transmitted to the physical layer device from the media access controller.

2. The physical layer device of claim 1:
wherein the plurality of data rates comprises a first data rate and a second data rate, wherein the first data rate is greater than the second data rate; and
wherein the control circuit selects N of the channels when selecting the first data rate and selects M of the channels when selecting the second data rate, wherein N>M.

3. An Ethernet communication device comprising the physical layer device of claim 1.

4. The Ethernet communication device of claim 3, wherein each of the channels comprises a twisted pair conductor.

5. The physical layer device of claim 1, further comprising output circuits, wherein:
the second data comprises the data sets received from the media access controller,
the coding circuit generates symbol sets;
each of the symbol sets correspond to a respective one of the data sets and comprises a plurality of symbols;
the control circuit selects at least one of the output circuits based on the condition; and
the at least one of the output circuits transmits the symbol sets to a media circuit for transmission of the symbols sets on the one or more of the plurality of channels.

6. The physical layer device of claim 5, wherein the physical layer device is Ethernet compliant.

7. The physical layer device of claim 6, wherein:
the control circuit transmits a message to a media circuit for transmission over the one or more of the plurality of channels; and
the message identifies channels corresponding to the at least one of the output circuits.

8. The physical layer device of claim 5, further comprising the media circuit, wherein:
the control circuit selects the at least one of the output circuits based on whether respective ones of the plurality of channels have one of an open circuit and a short circuit; and
the media circuit disables one of the plurality of channels that have one of an open circuit and a short circuit.

9. The physical layer device of claim 5, wherein:
the control circuit selects a bandwidth based on the condition;
the control circuit transmits the control signal to the media access controller indicating the bandwidth; and
the at least one of the output circuits transmits the symbol sets to the media circuit for transmission of the symbols sets on the one or more of the plurality of channels based on the bandwidth.

10. The physical layer device of claim 5, wherein the coding circuit encodes the symbols according to Pulse Amplitude Modulation 5 (PAM-5).

11. A communication device comprising:
the physical layer device of claim 1; and
the media access controller, wherein the media access controller adjusts the rate at which the data sets are transmitted to the physical layer device from the media access controller.

12. The communication device of claim 11, wherein:
the control circuit generates the control signal; and
the media access controller reduces the rate at which the data sets are transmitted to the physical layer device based on the control signal.

13. The communication device of claim 12, wherein:
the control circuit selects a bandwidth based on the condition; and
the communication device negotiates with another communication device to verify that the another communication device communicates on the selected channels and based on the bandwidth.

14. The physical layer device of claim 1, wherein the coding circuit generates the data sets based on symbol sets received from the one or more of the plurality of channels and transmits the symbol sets to the media access controller.

15. The physical layer device of claim 1, further comprising a multiplexer connected between the coding circuit and a media circuit, wherein:
the control circuit signals the multiplexer to maintain activation of the one or more of the plurality of channels and to disable other ones of the plurality of channels based on the condition;
the control circuit signals the media access controller to reduce a rate of transmitting data from the media access controller to the physical layer device based on a number of channels disabled; and
the multiplexer outputs data on multiplexer circuits that correspond to the one or more of the plurality of channels.

16. The physical layer device of claim 15, wherein:
the control circuit signals the multiplexer to reactivate ones of the disabled channels based on an updated condition of the disabled channels; and the control circuit signals the media access controller to increase a rate of transmitting data from the media access controller to the physical layer device based on a number of channels reactivated.

17. The physical layer device of claim 16, wherein:
the control circuit generates a first message identifying the maintained channels for transmission by a media circuit on the maintained channels; and
the control circuit generates a second message identifying the reactivated channels for transmission by the media circuit on the maintained channels and on the reactivated channels.

18. A physical layer device comprising:
coding means for transmitting first data, and for receiving second data, at one of a plurality of data rates;
communication means for transmitting first signals representing the first data, and for receiving second signals representing the second data, over one or more of a plurality of channels;
test means for determining a condition of the channels; and
control means for selecting the one of the plurality of the data rates, and for selecting the one or more of the plurality of the channels, based on the condition of the channels determined by the test means,
wherein the control means transmits a control signal to a media access controller based on the condition to adjust a rate at which data sets are transmitted to the physical layer device from the media access controller.

19. The physical layer device of claim 18:
wherein the plurality of data rates comprises a first data rate and a second data rate, wherein the first data rate is greater than the second data rate; and
wherein the control means selects N of the channels when selecting the first data rate and selects M of the channels when selecting the second data rate, wherein N>M.

20. An Ethernet communication device comprising the physical layer device of claim 18.

21. The Ethernet communication device of claim 20, wherein each of the channels comprises a twisted pair conductor.

22. A physical layer device comprising:
a coding circuit to transmit first data, and to receive second data, at one of a plurality of data rates;
a communication circuit to transmit first signals representing the first data, and to receive second signals representing the second data, over one or more of a plurality of channels;
a test circuit to determine a condition of the channels;
a control circuit to select the one of the plurality of the data rates, and to select the one or more of the plurality of the channels, based on the condition of the channels determined by the test circuit; and
a multiplexer connected between the coding circuit and a media circuit, wherein:
the control circuit signals the multiplexer to maintain activation of the one or more of the plurality of channels and to disable other ones of the plurality of channels based on the condition;
the control circuit signals a media access controller to reduce a rate of transmitting data from the media access controller to the physical layer device based on a number of channels disabled; and
the multiplexer outputs data on multiplexer circuits that correspond to the one or more of the plurality of channels.

23. The physical layer device of claim 22, wherein:
the control circuit signals the multiplexer to reactivate ones of the disabled channels based on an updated condition of the disabled channels; and
the control circuit signals the media access controller to increase a rate of transmitting data from the media access controller to the physical layer device based on a number of channels reactivated.

24. The physical layer device of claim 23, wherein:
the control circuit generates a first message identifying the maintained channels for transmission by a media circuit on the maintained channels; and
the control circuit generates a second message identifying the reactivated channels for transmission by the media circuit on the maintained channels and on the reactivated channels.

* * * * *